United States Patent [19]

Cheng et al.

[11] Patent Number: 5,763,544
[45] Date of Patent: Jun. 9, 1998

[54] CRYOGENIC COOLING OF EXOTHERMIC REACTOR

[75] Inventors: Alan Tat Yan Cheng, Livingston, N.J.; Deepak Lumba, Mohegan Lake, N.Y.

[73] Assignee: Praxair Technology, Inc., Danbury, Conn.

[21] Appl. No.: 783,902

[22] Filed: Jan. 16, 1997

[51] Int. Cl.[6] .................................................. C08F 2/00
[52] U.S. Cl. .......................... 526/78; 422/198; 422/207
[58] Field of Search ........................ 526/78; 422/198, 422/207

[56] References Cited

U.S. PATENT DOCUMENTS

| | | | |
|---|---|---|---|
| 3,622,281 | 11/1971 | Milligan et al. | 23/290 |
| 4,914,166 | 4/1990 | Kennedy et al. | 526/61 |
| 5,059,407 | 10/1991 | Wallace et al. | 423/421 |
| 5,362,455 | 11/1994 | Cheng | 422/253 |
| 5,394,827 | 3/1995 | Cheng | 117/206 |

OTHER PUBLICATIONS

Zsuga et al., "The Leidenfrost Reactor", Polymer Bulletin, 19, pp. 201–207, (1988).

Primary Examiner—David W. Wu
Attorney, Agent, or Firm—Stanley Ktorides

[57] ABSTRACT

Method and apparatus for effectively and safely using cryogenic liquid to cool a reactor vessel housing an exothermic reaction wherein the cryogenic liquid is subcooled, valved into the reactor in a downward direction, and shielded by annular coaxial shielding gas upon injection into the reactor.

6 Claims, 2 Drawing Sheets

CRYOGENIC COOLING OF EXOTHERMIC REACTOR

TECHNICAL FIELD

This invention relates generally to direct contact cooling and to cooling a reactor vessel housing an exothermic reaction.

BACKGROUND ART

It is important that a reactor containing an exothermic reaction be cooled for safety reasons as well as to ensure that the reaction proceeds efficiently. Cooling is generally carried out by indirect heat exchange such as by maintaining the reactor in a water bath or in a cooling jacket.

Direct heat exchange, wherein the cooling fluid directly contacts the contents of the reactor, is more efficient than indirect heat exchange but may be disadvantageous because the contact of the cooling fluid with the reactants may adulterate or otherwise harm the product.

Cryogenic liquids contain a large amount of refrigeration and might be useful for direct contact cooling of an exothermic reactor owing to the chemical inertness of many cryogenic liquids. However, because of the extremely cold temperatures characteristic of cryogenic liquids, freezing of the reactants, solvents and/or products of the reaction onto the injection device which provides the cryogenic liquid into the reactor vessel creates a danger that the flow of cryogenic liquid into the reactor vessel will slow or stop altogether. This will result in a runaway reaction with catastrophic consequences. Thus, the considerable potential advantages of using a cryogenic liquid to cool an exothermic reaction by direct contact have not been realized.

Accordingly, it is an object of this invention to provide a system which enables one to effectively employ a cryogenic liquid to cool a reactor containing an exothermic reaction by directly contacting the contents of the reactor with cryogenic liquid.

SUMMARY OF THE INVENTION

The above and other objects, which will become apparent to one skilled in the art upon a reading of this disclosure, are attained by the present invention, one aspect of which is:

A method for cooling a reactor containing an exothermic reaction comprising:

(A) subcooling a cryogenic liquid;

(B) passing the subcooled cryogenic liquid through at least one valve;

(C) thereafter injecting the cryogenic liquid in a downwardly directed stream into a reactor vessel containing an exothermic reaction;

(D) providing shielding gas around the downwardly directed stream injected into the reactor vessel; and (E) cooling the contents of the reactor vessel by direct heat exchange with the cryogenic liquid.

Another aspect of this invention is:

Apparatus for cooling a reactor containing an exothermic reaction comprising:

(A) a subcooler and a reactor vessel;

(B) means for providing cryogenic liquid into the subcooler;

(C) means for passing cryogenic liquid from the subcooler to the reactor vessel, said passing means comprising at least one valve;

(D) an injector for receiving cryogenic liquid and injecting cryogenic liquid into the reactor vessel, said injector oriented so as to inject cryogenic liquid into the reactor vessel in a downwardly directed stream; and (E) means for providing shielding gas around the downwardly directed stream of cryogenic liquid.

As used herein, the term "cryogenic liquid" means a liquid having a temperature at or below −80° C.

As used herein, the term "subcooling" means cooling a liquid to be at a temperature lower than that liquid's saturation temperature for the existing pressure.

As used herein, the term "exothermic reaction" means a chemical reaction which is accompanied by evolution of heat.

DETAILED DESCRIPTION

The invention is useful for controlling an exothermic reaction. An exothermic reaction occurs when the heat content or enthalpy of the product or products is lower than that of the reactant or reactants, and heat is liberated.

Many oxidation reactions release heat during production of industrial chemicals such as adipic acid, cyclohexane and maleic anhydride. Free-radical or cationic polymerization reactions are typically exothermic. Heat has to be removed from polystyrene, polymethyl methacrylate and butyl rubbers during the bulk polymerization step. Alkenes, such as methyl butene, isobutylene, dimethyl butene and heptene are made from catalytic hydrogenation under exothermic conditions.

Figure 1:
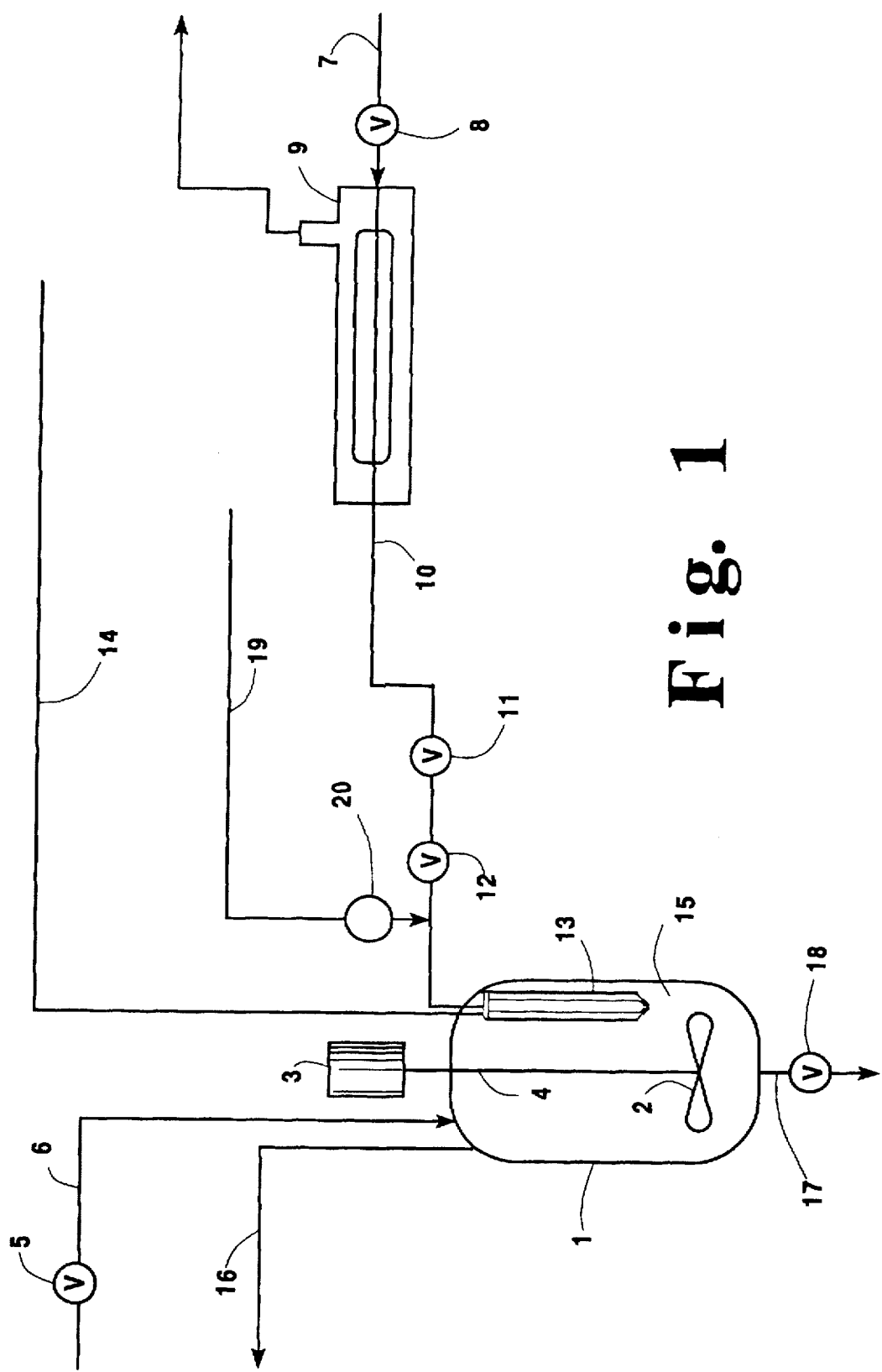
FIG. 1 is a simplified schematic representation of one embodiment of an arrangement for the practice of this invention.

The invention will be described in detail with reference to the Drawings. Referring now to FIG. 1, reactor vessel 1 preferably has an agitator 2 driven by motor 3 by means of connecting rod 4. Reactants are passed through valve 5 in conduit 6 and into reactor vessel 1 wherein they react in an exothermic reaction. The entire reaction mixture, e.g. reactants, solvents, catalysts, etc. could be provided into reactor vessel 1 as a mixture through a single conduit, as illustrated in FIG. 1, or the components of the reaction mixture could be provided into the reactor vessel through a plurality of conduits, separately or in any combination.

Cryogenic liquid is passed from a source (not shown), such as a storage tank, through conduit 7 and valve 8 into subcooler 9. Among the cryogenic liquids which may be used in the practice of this invention one can name liquid nitrogen, liquid argon, liquid helium, liquid carbon dioxide and liquid air. The preferred cryogenic liquid is liquid nitrogen. Generally the cryogenic liquid will be provided into subcooler 9 at a pressure generally within the range of from 20 to 100 pounds per square inch absolute (psia), although higher pressure may be used.

A subcooler is used to condition the liquid cryogen. The subcooler illustrated in FIG. 1 is a heat exchanger fashioned as a tube within a tube. In operation, a portion of the liquid cryogen, e.g. liquid nitrogen, under pressure from the central tube is metered into the annular space by a control valve. The annular space is maintained at essentially 0 pound per square inch gauge (psig) and therefore the metered fluid boils furiously until its saturated pressure reaches 0 psig. This boiling cools the annular liquid to a temperature lower than the liquid in the inner tube. By heat exchange with the colder annular fluid, the liquid nitrogen under pressure in the inner tube is subcooled below its saturation temperature. Any vaporized nitrogen (due to heat leak or pressure drop) in the inner tube will be condensed. The vapor generated by boiling in the annular space is vented to the atmosphere.

Subcooled cryogenic liquid is withdrawn from subcooler 9 through conduit 10 and is passed through at least one control valve wherein the liquid cryogen flow rate is regulated according to the refrigeration demands. The pressure of the liquid cryogen is reduced generally by at least 0.5 psi. In the embodiment of the invention illustrated in FIG. 1, subcooled cryogenic liquid is passed through control valve 12. When there is no refrigeration demand, control valve 12 is capable of shutting off the liquid cryogen flow completely.

A second valve upstream of the control valve is a shut-off valve at which loss in cryogen gas pressure or electrical power will cause valve 11 to shut off the liquid cryogen flow completely.

The resulting cryogenic liquid is then injected into reactor vessel 1 in a downward direction. By "downward" or "downwardly" it is meant within 45 degrees of vertical. In the embodiment illustrated in FIG. 1, the cryogenic liquid is passed into reactor vessel 1 through vertically oriented injector or provision means 13 which comprises a central passage and an outer passage coaxial with the central passage. The cryogenic liquid is passed through the central passage of provision means 13 while shielding gas, which has been provided into provision means 13 by means of conduit 14, is passed through the outer passage of provision means 13. Generally and preferably the shielding gas will have the same composition as the cryogenic liquid. The preferred shielding gas is gaseous nitrogen.

A backup gas, preferably gaseous nitrogen at room temperature, is supplied through conduit 19. Conduit 19 is connected immediately downstream of the control valve 12. The backup gas is operating at a pressure at least 5 psi lower than the liquid cryogen at the exit point of the control valve 12. The pressure of the backup gas is controlled by a discharge pressure regulator 20. Under normal or maximum cooling conditions, the backup gas will not be flowing since its pressure is lower than the liquid nitrogen in conduit 10. When the control valve reduces the liquid nitrogen flow to a point where the pressure at the exit of the control valve 12 is lower than the gaseous nitrogen in conduit 19, the backup nitrogen will start flow. This arrangement will keep the reactant from entering the cryogenic nitrogen system during the control actions of valve 11 or valve 12.

The cryogenic liquid and the shielding gas proceed through provision means 13 through the central and outer passages respectively and are injected into the interior volume of reactor vessel 1 preferably through injection nozzle 15 of injector 13. The cryogenic liquid is injected into the interior volume of reactor vessel 1 in a downwardly directed stream and the shielding gas is provided around this downwardly directed stream and for along at least a portion of its length.

The cryogenic liquid injected into the reactor vessel directly contacts the contents of the reactor vessel, e.g. reactants, solvents, products, etc., as well as the interior surface of the reactor vessel, and cools the contents and the reactor vessel itself by direct heat exchange. The direct heat exchange causes the cryogenic liquid to vaporize and this vaporized fluid as well as the shielding gas is passed out of reactor vessel 1 though conduit 16. The cooled reactor contents including the product are withdrawn from reactor vessel 1 through conduit 17 and valve 18 and the product is recovered. Preferably the reactor vessel is agitated such as by agitator 2 illustrated in FIG. 1 as this serves to better disperse the cryogenic liquid within the reactor vessel enabling better heat exchange and the avoidance of cold spots.

The subcooling of the cryogenic liquid enables the cryogen to be delivered to and injected into the reactor vessel essentially without any vaporization. This enables the control valve to dispense the correct proportion of coolant for the exothermic reaction. A large percentage of vaporized cryogen can create vapor locking of the transfer line and the injection nozzle, resulting in uncontrolled exothermic reactions or runaway reactions.

The backup gas and the shielding gas enable the avoidance of reactor contents freezing upon the injection device and clogging the device which has heretofore hampered the effective use of cryogenic liquid for cooling exothermic reactions. The greater mass and consequent force of the liquid cryogen stream forces away any liquid droplets or solid particles that might otherwise freeze onto the injector. The shielding gas serves as a physical barrier to ensure against any buildup of frozen particles from the periphery clogging the injector.

The downward injection direction is also important in achieving the beneficial results of the invention. As the cryogenic liquid is vaporized, a portion of the resulting vapor rises back up and forms a protective gas bubble or barrier around the tip of the injector proximate where the cryogenic liquid is injected into the reactor vessel. Cryogenic liquid passes easily downward through this protective bubble but the bubble forms a barrier serving to keep the reactor vessel contents from contacting and freezing upon the injector.

Thus the subcooling, shielding gas and downward injection work in concert to enable cryogenic liquid to be employed for cooling exothermic reactions without encountering clogging of the cryogen provision means by frozen rector vessel contents which results in reduction or total loss of coolant and a runaway reaction.

Figure 2:
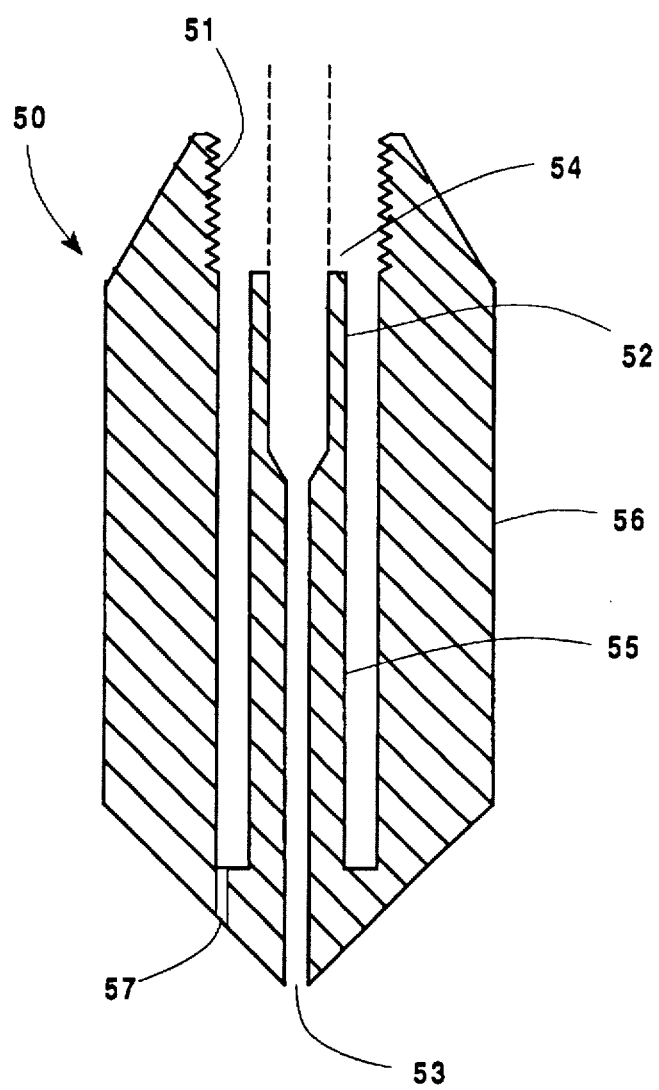
FIG. 2 is a cross-sectional representation of one preferred embodiment of a nozzle which may be used to inject cryogenic liquid into the reactor vessel in the practice of this invention.

FIG. 2 illustrates a preferred embodiment of a nozzle which may be used, such as nozzle 15 of FIG. 1, to provide both cryogenic liquid and shielding gas into the interior of the reactor vessel. Referring now to FIG. 2, injection nozzle 50 can be attached to the cryogen provision means by means of threads 51. Nozzle 50 comprises central section 52 which communicates with and thus extends the central passage of the cryogen provision means and which receives cryogenic liquid for injection into the interior of the reactor vessel at cryogenic liquid injection point 53. Central section 52 has an upstream section 54, which has a diameter similar to that of the central passage, and a downstream section 55, which has a diameter smaller than that of upstream section 54.

Nozzle 50 also comprises outer section 56 which forms a passage coaxial to central section 52, which communicates with the outer passage of and thus extends the cryogen provision means, and which receives shielding gas for injection into the interior of the reactor vessel at shielding gas injection point 57.

The injection end or face of nozzle 50 is in the shape of an inverted cone. In this way cryogenic liquid injection point 53 is lower than shielding gas injection point 57 so that the shielding gas enters the interior of the reactor vessel before, i.e. upstream of, the cryogenic liquid. That is, injection point 53 is closer to the apex of the cone of the face of nozzle 50 than is injection point 57; preferably, as illustrated in FIG. 2, injection point 53 is at this apex. This ensures that the cryogenic liquid injection point is fully shielded at all times.

Now by the use of this invention one can effectively and safely use cryogenic liquid to cool a reactor containing an exothermic reaction. Although the invention has been described in detail with reference to certain preferred embodiments, those skilled in the art will recognize that there are other embodiments of the invention within the spirit and the scope of the claims.

We claim:

1. A method for cooling a reactor containing an exothermic reaction comprising:

(A) subcooling a cryogenic liquid;
   (B) passing the subcooled cryogenic liquid through at least one valve;
   (C) thereafter injecting the cryogenic liquid in a downwardly directed stream into a reactor vessel containing an exothermic reaction;
   (D) providing shielding gas around the downwardly directed stream injected into the reactor vessel; and
   (E) cooling the contents of the reactor vessel by direct heat exchange with the cryogenic liquid.

2. The method of claim 1 wherein the cryogenic liquid comprises nitrogen.

3. The method of claim 1 wherein the shielding gas comprises nitrogen.

4. The method of claim 1 wherein the direct heat exchange vaporizes the cryogenic liquid and at least a portion of the resulting vaporized fluid rises and forms a vapor barrier proximate where the cryogenic liquid is injected into the reactor vessel.

5. The method of claim 1 wherein the cryogenic liquid stream is injected into the reactor vessel lower than where the shielding gas is provided into the reactor vessel.

6. The method of claim 1 further comprising making back up gas available to the subcooled cryogenic liquid prior to where the cryogenic liquid is injected into the reactor vessel, said back up gas being at a pressure lower than the pressure of the subcooled cryogenic liquid.

* * * * *